US011787923B2

(12) United States Patent
Sugimoto et al.

(10) Patent No.: US 11,787,923 B2
(45) Date of Patent: Oct. 17, 2023

(54) RUBBER COMPOSITION FOR TIRE AND PNEUMATIC TIRE

(71) Applicant: The Yokohama Rubber Co., LTD., Tokyo (JP)

(72) Inventors: Hiroki Sugimoto, Hiratsuka (JP); Shuichi Nakano, Hiratsuka (JP); Makoto Ashiura, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 1079 days.

(21) Appl. No.: 16/077,405

(22) PCT Filed: Feb. 8, 2017

(86) PCT No.: PCT/JP2017/004523
§ 371 (c)(1),
(2) Date: Aug. 10, 2018

(87) PCT Pub. No.: WO2017/138553
PCT Pub. Date: Aug. 17, 2017

(65) Prior Publication Data
US 2021/0171746 A1 Jun. 10, 2021

(30) Foreign Application Priority Data
Feb. 12, 2016 (JP) .................. 2016-025224

(51) Int. Cl.
| | | |
|---|---|---|
| *C08L 9/06* | (2006.01) | |
| *B60C 1/00* | (2006.01) | |
| *C08L 23/22* | (2006.01) | |
| *C08L 25/00* | (2006.01) | |
| *C08L 83/04* | (2006.01) | |
| *C08K 3/36* | (2006.01) | |
| *C08K 5/40* | (2006.01) | |

(52) U.S. Cl.
CPC ............. *C08L 9/06* (2013.01); *B60C 1/0016* (2013.01); *C08L 23/22* (2013.01); *C08L 25/00* (2013.01); *C08L 83/04* (2013.01); *C08K 3/36* (2013.01); *C08K 5/40* (2013.01); *C08K 2201/006* (2013.01)

(58) Field of Classification Search
CPC ......... B60C 1/0016; C08L 9/06; C08L 23/22; C08L 25/00; C08L 83/04; C08K 3/36; C08K 5/40; C08K 2201/006
See application file for complete search history.

(56) References Cited

U.S. PATENT DOCUMENTS

| | | |
|---|---|---|
| 6,127,468 A | 10/2000 | Cruse et al. |
| 6,204,339 B1 | 3/2001 | Waldman et al. |
| 6,414,061 B1 | 7/2002 | Cruse et al. |
| 2002/0055564 A1 | 5/2002 | Cruse et al. |
| 2002/0055568 A1 | 5/2002 | Pickwell et al. |
| 2002/0055646 A1 | 5/2002 | Cruse et al. |
| 2002/0099118 A1 | 7/2002 | Cruse et al. |
| 2003/0225195 A1 | 12/2003 | Cruse et al. |
| 2004/0210001 A1 | 10/2004 | Cruse et al. |
| 2006/0014870 A1 | 1/2006 | Cruse et al. |
| 2006/0183866 A1 | 8/2006 | Pohl et al. |
| 2007/0083011 A1 | 4/2007 | Pohl et al. |
| 2011/0245370 A1* | 10/2011 | Uesaka ................. C08K 3/36 523/155 |
| 2013/0267646 A1 | 10/2013 | Kameda et al. |
| 2015/0133600 A1 | 5/2015 | Iizuka et al. |
| 2015/0329704 A1* | 11/2015 | Miyazaki ............... C08K 3/36 524/492 |
| 2015/0353657 A1* | 12/2015 | Yukimura ........... C08K 5/3725 525/236 |
| 2016/0009843 A1* | 1/2016 | Sato ....................... C08L 9/06 525/236 |

FOREIGN PATENT DOCUMENTS

| | | |
|---|---|---|
| JP | 2001-505225 | 4/2001 |
| JP | 2005-263998 | 9/2005 |
| JP | 2013-075986 | 4/2013 |
| JP | 2014-047295 | 3/2014 |
| JP | 2015-196759 | 11/2015 |
| JP | 2016-011334 | 1/2016 |
| JP | 2016-047887 | 4/2016 |
| WO | WO 99/09036 | 2/1999 |
| WO | WO 2014/050341 | 4/2014 |
| WO | WO 2016/031783 | 3/2016 |

OTHER PUBLICATIONS

International Search Report for International Application No. PCT/JP2017/004523 dated May 16, 2017, 4 pages, Japan.

* cited by examiner

*Primary Examiner* — Angela C Scott
(74) *Attorney, Agent, or Firm* — THORPE NORTH & WESTERN

(57) ABSTRACT

A rubber composition of the present technology contains: diene rubber (A) containing a predetermined amount of specific conjugated diene rubber represented by a predetermined formula; silica having a CTAB adsorption specific surface area in a predetermined range; and a silane coupling agent represented by a predetermined formula.

11 Claims, 1 Drawing Sheet

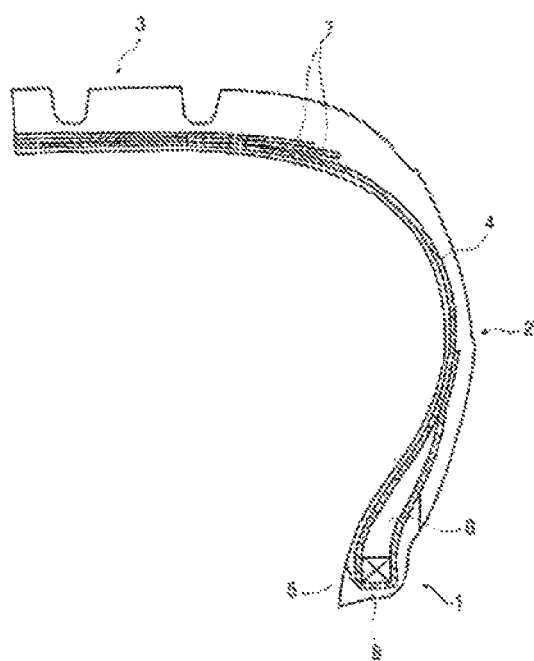

RUBBER COMPOSITION FOR TIRE AND PNEUMATIC TIRE

TECHNICAL FIELD

The present technology relates to a rubber composition for a tire and a pneumatic tire.

BACKGROUND ART

Japan Unexamined Patent Publication No. 2005-263998 describes a "rubber composition for a pneumatic tire, the rubber composition including, per 100 parts by weight of a rubber component including copolymer rubber obtained by copolymerizing 1,3-butadiene and styrene by using an organic lithium compound as an initiator and having a glass transition point of not lower than −40° C. alone, or per 100 parts by weight of a rubber component including a blend of not less than 50 wt. % of the copolymer rubber and not greater than 50 wt. % of other diene rubber, 20 to 100 parts by weight of silica having a BET (Brauner Emmett Teller) specific surface area of from 210 to 300 m²/g and a CTAB (cetyltrimethylammonium bromide) adsorption specific surface area of from 160 to 300 m²/g and 0 to 100 parts by weight of carbon black compounded to result in a total quantity of the silica and the carbon black of from 70 to 150 parts by weight, and 2 to 25 parts by weight of a silane coupling agent represented by the general formula below compounded per 100 parts by weight of the silica:

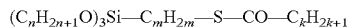

$(C_nH_{2n+1}O)_3Si-C_mH_{2m}-S-CO-C_kH_{2k+1}$ where n is an integer from 1 to 3, m is an integer from 1 to 5, and k is an integer from 5 to 9."

The present inventors have studied the rubber composition for a tire described in Japan Unexamined Patent Publication No. 2005-263998, and have found that the rubber composition for a tire has poor processability and additionally, a pneumatic tire using the rubber composition for a tire in a tire tread does not satisfy standards required these days for wear resistance performance and wet performance.

SUMMARY

The present technology provides a rubber composition for a tire having excellent processability and capable of manufacturing a pneumatic tire having excellent wear resistance performance and wet performance, and a pneumatic tire using the rubber composition for a tire in a tire tread.

As a result of diligent research to solve the above-described problems, the present inventors have found that the above-described problems can be solved by a rubber composition for a tire containing diene rubber (A) containing a predetermined amount of specific conjugated diene rubber represented by Formula (1) below, silica having a CTAB adsorption specific surface area in a predetermined range, and a silane coupling agent represented by Formula (2) below, and the present inventors have completed the present technology.

In other words, the present inventors have found that the above-described problems can be solved by the following configurations.

[1] A rubber composition for a tire containing diene rubber (A), silica (B), and a silane coupling agent (C), wherein the diene rubber (A) contains not less than 10 mass % of specific conjugated diene rubber represented by Formula (1) below, and containing a polymer block A containing a structural unit based on a monomer and containing isoprene (also referred to as an "isoprene unit" below) and a structural unit based on a monomer and containing aromatic vinyl (also referred to as an "aromatic vinyl unit" below), a polymer block B containing a structural unit based on a monomer and containing 1,3-butadiene (also referred to as a "1,3-butadiene unit" below), and a polymer block C containing a polyorganosiloxane; a mass ratio of the structural unit based on a monomer and containing isoprene to the structural unit based on a monomer and containing aromatic vinyl (the structural unit based on a monomer and containing isoprene/the structural unit based on a monomer and containing aromatic vinyl) in the polymer block A is from 80/20 to 95/5, and a formula weight of the polymer block A is from 500 to 15000; a CTAB adsorption specific surface area of the silica (B) is from 180 to 250 m²/g; the silane coupling agent (C) is a silane coupling agent represented by Formula (2) below; and the polyorganosiloxane is a polyorganosiloxane represented by Formula (3) below.

[2] The rubber composition for a tire according to [1], wherein a weight average molecular weight of the specific conjugated diene rubber is from 400000 to 750000 and an average glass transition temperature of the specific conjugated diene rubber is from −40 to −20° C.

[3] The rubber composition for a tire according to [1] or [2], wherein a content of the silica (B) is from 90 to 150 parts by mass per 100 parts by mass of the diene rubber (A).

[4] The rubber composition for a tire according to any one of [1] to [3], wherein the diene rubber (A) contains butadiene rubber.

[5] The rubber composition for a tire according to [4], wherein a linearity index value of the butadiene rubber is from 120 to 150.

[6] The rubber composition for a tire according to any one of [1] to [5], further containing an aromatic modified terpene resin having a softening point from 100 to 150° C., wherein a content of the aromatic modified terpene resin is from 1 to 50 parts by mass per 100 parts by mass of the diene rubber (A).

[7] The rubber composition for a tire according to any one of [1] to [6], further containing a thiuram-based vulcanization accelerator.

[8] The rubber composition for a tire according to any one of [1] to [7], further containing at least one metal salt selected from the group consisting of a potassium salt, a sodium salt, a calcium salt, and a zinc salt.

[9] A pneumatic tire using the rubber composition for a tire described in any one of [1] to [8] in a tire tread.

According to the present technology, a rubber composition for a tire having excellent processability and capable of manufacturing a pneumatic tire having excellent wear resistance performance and wet performance can be provided, and a pneumatic tire using the rubber composition for a tire in a tire tread can be provided.

BRIEF DESCRIPTION OF DRAWINGS

FIG. 1 is a partial cross-sectional schematic view of a tire representing an example of a pneumatic tire according to an embodiment of the present technology.

DETAILED DESCRIPTION

The present technology will be described in detail below.

Although configuration requirements may be described below based on representative embodiments of the present technology, the present technology is not limited to such embodiments.

Note that herein, the numerical value range indicated by using "(from) . . . to . . . " includes the former value as a lower limit value and the later value as an upper limit value.

Rubber Composition for Tire

The rubber composition for a tire according to an embodiment of the present technology contains diene rubber (A), silica (B), and a silane coupling agent (C).

Additionally, in the rubber composition for a tire according to an embodiment of the present technology, the diene rubber (A) contains not less than 10 mass % of specific conjugated diene rubber represented by Formula (1) below, and containing a polymer block A containing an isoprene unit and an aromatic vinyl unit, a polymer block B containing a 1,3-butadiene unit, and a polymer block C containing a polyorganosiloxane represented by Formula (3) below.

Additionally, in the rubber composition for a tire according to an embodiment of the present technology, a mass ratio of the isoprene unit to the aromatic vinyl unit (isoprene unit/aromatic vinyl unit) in the polymer block A is from 80/20 to 95/5, and a formula weight of the polymer block A is from 500 to 15000.

Additionally, in the rubber composition for a tire according to an embodiment of the present technology, a CTAB adsorption specific surface area of the silica (B) is from 180 to 250 m$^2$/g.

Additionally, in the rubber composition for a tire according to an embodiment of the present technology, the silane coupling agent (C) is a silane coupling agent represented by Formula (2) below.

In the field of the present technology of a pneumatic tire for an automobile (also referred to as a "tire" below), a pneumatic tire contributing to fuel efficiency, a so-called fuel-efficient tire, and a rubber composition for a tire used for manufacturing such a tire have been sought recently from the perspective of suppressing an amount of carbon dioxide gas generated by fuel combustion. A fuel-efficient tire needs to have a small energy loss in a unit movement distance, and recent development has focused on a pneumatic tire having such a characteristic and additionally having excellent wear resistance and wet performance, and a rubber composition for a tire used for manufacturing such a tire.

However, the present inventors have found that there is a trade-off between a decrease in an energy loss in a unit movement distance and wet performance. Reducing an energy loss of a vulcanized product of a rubber composition for a tire used in a tire tread (referred to simply as a "vulcanized product" below) with the aim of obtaining a fuel-efficient tire also means that input kinetic energy is difficult to convert to heat and sound. Particularly, in a wet environment in which a water film is interposed between a road surface and a tire tread and friction force due to an adhesion term between the road surface and the tire tread reduces, a coefficient of friction contributing to gripability depends on a hysteresis loss (hysteresis term). Therefore, a simple reduction in an energy loss of a vulcanized product with the aim of obtaining a fuel-efficient tire has been likely to reduce gripping force (wet performance) in the wet environment.

On the other hand, an attempt to improve gripping force by raising a coefficient of friction causes a problem of an increase in an amount of wear, and in turn, a reduction in wear resistance performance. Thus, to control characteristics of a pneumatic tire, it is necessary to solve the problem of the contradiction due to physical properties as a viscoelastic member of a rubber composition for a tire used for manufacturing such a tire.

Japan Unexamined Patent Publication No. 2005-263998 describes the following: "by using styrene-butadiene rubber having a high glass transition point in the rubber component and by using a protected mercaptosilane together with a small-particle-size silica as a silane coupling agent, incorporation of the silica into the rubber component in the mixture can be enhanced and dispersibility of the small-particle-size silica having a high cohesion can be enhanced, and furthermore, grip performance on a wet road surface and a dry road surface can be enhanced."

The present inventors have found that the simple compounding of silica in styrene-butadiene rubber to simply improve dispersibility of the silica as described above does not sufficiently solve the problems of the present technology. The present inventors have deduced that a loss tangent (also referred to as "tan δ" below) of a vulcanized product can be controlled by dispersing silica in a rubber composition for a tire and further incorporating and constraining a portion of a molecular chain of a rubber molecular into a structure including a primary aggregate of dispersed silica particulate elements (this effect is referred to as a "reinforcement effect of silica" below), and thus desired wear resistance performance and wet performance can be obtained.

In other words, to incorporate a portion of a molecular chain of a rubber molecular into a structure having a primary aggregate of silica, certain shear force is necessary during kneading of a rubber composition for a tire. This requires high viscosity of the rubber composition for a tire during kneading.

When a silane coupling agent is compounded in styrene-butadiene rubber, physical aggregation of silica caused when hydrophilic silica is mixed into a hydrophobic rubber composition for a tire comes loose (a secondary aggregate formed by further aggregation of the primary aggregate), and dispersibility of the silica can be improved. On the other hand, this reduces viscosity of the rubber composition for a tire during kneading. As described above, when the viscosity of the rubber composition for a tire during kneading reduces, shear force sufficient for incorporating a molecular chain of a rubber molecular into a structure having a primary aggregate of silica may not be obtained and a desired reinforcement effect may not be obtained.

However, there is also a problem in processing that becomes difficult when viscosity of the rubber composition for a tire is simply increased.

To obtain a rubber composition for a tire capable of producing a vulcanized product having these characteristics, the present inventors have made a compounding design, focusing on an interaction of diene rubber, silica, and a silane coupling agent due to structures of the diene rubber, the silica, and the silane coupling agent, and as a result, the present inventors have achieved the present technology and solved this difficult problem.

In other words, one of features of the present technology is to use the diene rubber (A) containing a predetermined amount of the specific conjugated diene rubber having a predetermined primary structure, the silica (B) having a predetermined CTAB adsorption specific surface area, and the silane coupling agent (C) having a predetermined primary structure.

This feature of the present technology is further divided into the following three features, and it is deduced that since the present technology has these three features at the same time, the rubber composition for a tire according to an embodiment of the present technology obtains the effect of the present technology.

First, as a first point, the diene rubber (A) in the present technology contains a predetermined amount of the specific conjugated diene rubber having a predetermined primary structure. This specific conjugated diene rubber contains the polymer blocks A and B each having high reactivity with the silane coupling agent (C) described below, and has a primary structure joined to the polymer block C, and thus the specific conjugated diene rubber is considered to contribute to obtaining the effect of the present technology. This is also evident from comparison of Example 1, Comparative Example 4, and Comparative Example 6 described below.

Next, as a second point, the rubber composition for a tire according to an embodiment of the present technology contains the silica (B) having a CTAB adsorption specific surface area in a predetermined range. Accordingly, it is considered that a portion of a molecular chain of the specific conjugated diene rubber can be constrained efficiently in the silica (B), and thus the silica (B) is considered to contribute to obtaining the effect of the present technology. This is also evident from comparison of Comparative Example 7 and Comparative Example 8 described below and demonstrating that a pneumatic tire having relatively good wear resistance performance and wet performance can be manufactured by using a rubber composition for a tire of Comparative Example 8 containing the diene rubber (A) containing a predetermined amount of the specific conjugated diene rubber, and the silica (B) predetermined.

However, since certain shear force becomes necessary during kneading as described above, Comparative Example 8 does not reach a desired level of processability of the present technology. The silane coupling agent (C) described below is considered to contribute in this regard.

In other words, a third feature of the rubber composition for a tire according to an embodiment of the present technology is that the rubber composition for a tire contains the silane coupling agent (C) including a structure in which a mercapto group having high reactivity with the diene rubber (A) is protected. It is considered that the rubber composition for a tire contains the silane coupling agent having such a specific structure, and thus, kneading time and temperature sufficient for dispersion of the silica is ensured, and viscosity during kneading reduces to obtain good processability. Additionally, it is considered that since the diene rubber (A) and the silane coupling agent (C) deprotected react quickly during vulcanization, the reinforcement effect of silica is sufficiently exhibited. Thus, the silane coupling agent (C) is considered to contribute to obtaining the effect of the present technology. This is also evident from comparison of Example 1, Comparative Example 8, and Comparative Example 9.

The above describes the deduced mechanism of obtaining such an effect that the rubber composition for a tire of the present technology has excellent processability and that a pneumatic tire manufactured by using the rubber composition for a tire has excellent wear resistance performance and wet performance (also referred to as the "effect of the present technology" below). However, the scope of the present technology is not to be interpreted limitedly by this deduction.

Diene Rubber (A)

The diene rubber (A) in the rubber composition for a tire according to an embodiment of the present technology is not particularly limited as long as the diene rubber (A) contains not less than 10 mass % of the specific conjugated diene rubber described below, and from the perspective of further improving the effect of the present technology, the diene rubber (A) contains preferably from 20 to 100 mass % and more preferably from 30 to 70 mass % of the specific conjugated diene rubber.

The diene rubber (A) other than the specific conjugated diene rubber is not particularly limited, but examples of the diene rubber (A) other than the specific conjugated diene rubber include natural rubber, isoprene rubber, butadiene rubber, styrene-isoprene rubber, butadiene-isoprene rubber, styrene-isoprene-butadiene rubber, and nitrile rubber. From the perspective of improving wear resistance of a vulcanized product, natural rubber or butadiene rubber is preferable, and butadiene rubber is more preferable. A single type of the diene rubber (A) may be used alone, or two or more types thereof may be used in combination.

Specific Conjugated Diene Rubber

The specific conjugated diene rubber is represented by Formula (1) below, and contains the polymer block A containing the isoprene unit and the aromatic vinyl unit, the polymer block B containing the 1,3-butadiene unit, and the polymer block C containing a polyorganosiloxane. A mass ratio of the isoprene unit to the aromatic vinyl unit (isoprene unit/aromatic vinyl unit) in the polymer block A is from 80/20 to 95/5, and a formula weight of the polymer block A is from 500 to 15000.

$$A\text{-}B\text{-}C \qquad \text{Formula (1)}$$

In Formula (1), A represents the polymer block A, B represents the polymer block B, and C represents the polymer block C.

Note that the specific conjugated diene rubber may contain a plurality of the polymer blocks A as described below and/or may contain other polymer blocks, or may include a branched chain structure. Examples of the specific conjugated diene rubber include conjugated diene rubber containing the polymer block A-the polymer block B-the polymer block A-the polymer block C; and conjugated diene rubber containing a block including the polymer block A-the polymer block B-isoprene alone-the polymer block C. The specific conjugated diene rubber includes all of these types of conjugated diene rubber.

A method of producing the specific conjugated diene rubber of the present technology is not limited, but the specific conjugated diene rubber of the present technology can be synthesized by the following method, for example.

Step A: a step of polymerizing a monomer mixture containing isoprene and aromatic vinyl to form the polymer block A having an active terminal and having a mass ratio of the isoprene unit to the aromatic vinyl unit (isoprene unit/aromatic vinyl unit) from 80/20 to 95/5 and a formula weight from 500 to 15000

Step B: a step of mixing the polymer block A with a monomer mixture containing 1,3-butadiene and aromatic vinyl to continue polymerization reaction, and forming the polymer block B having an active terminal and continuous with the polymer block A to obtain a conjugated diene polymer chain having an active terminal and containing the polymer block A and the polymer block B Step C: a step of reacting a polyorganosiloxane represented by Formula (3) below with the active terminal of the above-described conjugated diene polymer chain Each of the steps will be described in detail below.

Step A

At step A, the polymer block A having an active terminal, and having a mass ratio of the isoprene unit to the aromatic vinyl unit (isoprene unit/aromatic vinyl unit) from 80/20 to 95/5 and a formula weight from 500 to 15000 is formed.

The above-described monomer mixture may include isoprene and aromatic vinyl alone, or may include a monomer other than isoprene and aromatic vinyl.

The aromatic vinyl is not particularly limited, but examples of the aromatic vinyl include styrene, α-methylstyrene, 2-methyl styrene, 3-methyl styrene, 4-methyl styrene, 2-ethyl styrene, 3-ethyl styrene, 4-ethylstyrene, 2,4-diisopropylstyrene, 2,4-dimethyl styrene, 4-t-butylstyrene, 5-t-butyl-2-methylstyrene, vinylnaphthalene, dimethylaminomethylstyrene, and dimethylaminoethylstyrene. Among these, styrene is preferable. A single type of the aromatic vinyl may be used alone, or two or more types thereof may be used in combination.

Examples of the monomer other than isoprene and aromatic vinyl include conjugated diene other than isoprene such as 1,3-butadiene, 2,3-dimethyl-1,3-butadiene, 2-chloro-1,3-butadiene, 1,3-pentadiene, and 1,3-hexadiene; α,β-unsaturated nitrile such as acrylonitrile and methacrylonitrile; an unsaturated carboxylic acid or an acid anhydride such as an acrylic acid, a methacrylic acid, and a maleic anhydride; unsaturated carboxylic acid ester such as methylmethacrylate, ethylacrylate, and butylacrylate; and non-conjugated diene such as 1,5-hexadiene, 1,6-heptadiene, 1,7-octadiene, dicyclopentadiene, and 5-ethylidene-2-norbornene. Among these, 1,3-butadiene is preferable. A single type of the monomer other than isoprene and aromatic vinyl may be used alone, or two or more types thereof may be used in combination.

The above-described monomer mixture is preferably polymerized in an inert solvent.

The inert solvent is not particularly limited as long as the inert solvent is an inert solvent normally used in solution polymerization and not inhibiting polymerization reaction. Specific examples of the inert solvent include chain aliphatic hydrocarbon such as butane, pentane, hexane, heptane, and 2-butene; alicyclic hydrocarbon such as cyclopentane, cyclohexane, and cyclohexene; and aromatic hydrocarbon such as benzene, toluene, and xylene. As for a used amount of the inert solvent, monomer mixture concentration is, for example, from 1 to 80 mass %, and preferably from 10 to 50 mass %.

The above-described monomer mixture is preferably polymerized by a polymerization initiator.

The polymerization initiator is not particularly limited as long as the polymerization initiator polymerizes a monomer mixture containing isoprene and aromatic vinyl and gives a polymer chain having an active terminal. Specific examples of the polymerization initiator preferably used include polymerization initiators using as a primary catalyst an organic alkali metal compound, an organic alkali earth metal compound, a lanthanide series metal compound, and the like. Examples of the organic alkali metal compound include an organic monolithium compound such as n-butyllithium, sec-butyllithium, t-butyllithium, hexyl lithium, phenyl lithium, and stilbene lithium; an organic poly-lithium compound such as dilithiomethane, 1,4-dilithiobutane, 1,4-dilithio-2-ethylcyclohexane, 1,3,5-trilithiobenzene, and 1,3,5-tris(lithiomethyl)benzene; an organic sodium compound such as sodium naphthalene; and an organic potassium compound such as potassium naphthalene. Additionally, examples of the organic alkali earth metal compound include di-n-butylmagnesium, di-n-hexylmagnesium, diethoxycalcium, calcium di stearate, di-t-butoxystrontium, diethoxybarium, diisopropoxybarium, diethylmercaptobarium, di-t-butoxybarium, diphenoxybarium, diethylaminobarium, barium distearate, and diketylbarium. An example of the polymerization initiator using a lanthanide series metal compound as a primary catalyst includes a polymerization initiator using as a primary catalyst a lanthanide series metal salt including a lanthanide series metal such as lanthanum, cerium, praseodymium, neodymium, samarium, and gadolinium, a carboxylic acid, a phosphorus-containing organic acid, and the like, and including the primary catalyst together with a promoter such as an alkylaluminum compound, an organoaluminum hydride compound, and an organoaluminum halide compound. Among these polymerization initiators, an organic monolithium compound is preferably used, and n-butyllithium is more preferably used. Note that the organic alkali metal compound may be reacted in advance with a secondary amine such as dibutylamine, dihexylamine, dibenzylamine, pyrrolidine, hexamethyleneimine, and heptamethyleneimine to be used as an organic alkali metal amide compound. A single type of the polymerization initiator may be used alone, or two or more types thereof may be used in combination.

A used amount of the polymerization initiator may be determined according to a target molecular weight, and is preferably from 4 to 250 mmol, more preferably from 6 to 200 mmol, and particularly preferably from 10 to 70 mmol, per 100 g of the monomer mixture.

A polymerization temperature at which the above-described monomer mixture is polymerized is, for example, from −80 to +150° C., preferably from 0 to 100° C., and more preferably from 20 to 90° C.

As a polymerization mode, any mode such as a batch mode and a continuous mode can be adopted. Additionally, as a bond mode, a variety of bond modes such as a block mode, a tapered mode, and a random mode can be adopted.

An example of a method of regulating a 1,4-bond content in the isoprene unit in the polymer block A includes a method including adding a polar compound to an inert solvent at the time of polymerization and adjusting an added amount of the polar compound. Examples of the polar compound include an ether compound such as dibutylether, tetrahydrofuran, and 2,2-di(tetrahydrofuryl)propane; a tertiary amine such as tetramethylethylenediamine; an alkali metal alkoxide; and a phosphine compound. Among these, an ether compound and a tertiary amine are preferable. Among these, an ether compound and a tertiary amine capable of forming a chelate structure with a metal of the polymerization initiator are more preferable, and 2,2-di(tetrahydrofuryl)propane and tetramethylethylenediamine are particularly preferable.

A used amount of the polar compound may be determined according to a target 1,4-bond content, and is preferably from 0.01 to 30 mol, and more preferably from 0.05 to 10 mol, with respect to 1 mol of the polymerization initiator. When the used amount of the polar compound is in the above-described range, it is easy to regulate the 1,4-bond content in the isoprene unit, and a defect due to deactivation of the polymerization initiator is difficult to generate.

The 1,4-bond content in the isoprene unit in the polymer block A is preferably from 10 to 95 mass %, and more preferably from 20 to 95 mass %.

Note that herein, the 1,4-bond content in the isoprene unit refers to a proportion (mass %) of an isoprene unit including a 1,4-bond with respect to all isoprene units in the polymer block A. Note that herein, the vinyl bond content in the isoprene unit refers to total mass of an isoprene unit including a 1,2-bond or a 3,4-bond with respect to all isoprene units.

The formula weight of the polymer block A may be determined by measuring a weight average molecular weight (Mw) of the polymer block A at a final stage of step A. The weight average molecular weight of the polymer block A is calculated as a value in terms of polystyrene measured by gel permeation chromatography (GPC), and is from 500 to 15000. Particularly, the weight average molecular weight of the polymer block A is more preferably from 1000 to 12000, even more preferably from 1500 to 10000, and particularly preferably from 2500 to 10000.

When the formula weight of the polymer block A is less than 500, terminal chain concentration of the specific conjugated diene rubber in the rubber composition for a tire increases, and therefore, tan δ at or near 60° C. increases and rolling resistance of a vulcanized product (energy loss in a unit movement distance as a tire) increases.

On the other hand, when the formula weight of the polymer block A is greater than 15000, dispersibility of silica is impaired, and therefore, wear resistance performance and wet performance of a vulcanized product are poor.

Molecular weight distribution expressed by a ratio (Mw/Mn) of the weight average molecular weight (Mw) to the number average molecular weight (Mn) of the polymer block A is preferably from 1.0 to 1.5 and more preferably from 1.0 to 1.3. When a value of the molecular weight distribution (Mw/Mn) of the polymer block A is in the above-described range, the specific conjugated diene rubber becomes easier to produce. Note that the Mw and the Mn are both values in terms of polystyrene measured by GPC.

A mass ratio of the isoprene unit to the aromatic vinyl unit (isoprene unit/aromatic vinyl unit) in the polymer block A is from 80/20 to 95/5, and from the perspective of further improving the effect of the present technology, the mass ratio is preferably from 85/15 to 95/5 and more preferably from 87/13 to 95/5.

Note that a content of a structural unit other than the isoprene unit and the aromatic vinyl unit in the polymer block A is preferably not greater than 15 mass %, more preferably not greater than 10 mass %, and even more preferably not greater than 6 mass %, in the polymer block A.

Step B

At step B, the polymer block A formed at step A as described above is mixed with a monomer containing 1,3-butadiene to continue polymerization reaction, and the polymer block B having an active terminal and continuous with the polymer block A is formed to obtain a conjugated diene polymer chain having an active terminal and containing the polymer block A and the polymer block B.

Note that from the perspective of further improving the effect of the present technology, in addition to the monomer containing 1,3-butadiene, a monomer containing aromatic vinyl is preferably mixed to continue polymerization reaction.

Specific examples and suitable aspects of the monomer containing aromatic vinyl are as described above.

The above-described monomer mixture is preferably polymerized in an inert solvent.

Definition, specific examples, and suitable aspects of the inert solvent are as described above.

A used amount of the polymer block A having an active terminal to form the polymer block B may be determined in accordance with a target molecular weight, and the used amount of the polymer block A is, for example, from 0.1 to 5 mmol, preferably from 0.15 to 2 mmol, and more preferably from 0.2 to 1.5 mmol, per 100 g of the monomer containing 1,3-butadiene or a mixture of the monomer containing 1,3-butadiene and the monomer containing aromatic vinyl.

A method of mixing the polymer block A and the monomer containing 1,3-butadiene or the mixture of the monomer containing 1,3-butadiene and the monomer containing aromatic vinyl is not particularly limited. The polymer block A having an active terminal may be added to a solution of the monomer containing 1,3-butadiene or a solution of the mixture of the monomer containing 1,3-butadiene and the monomer containing aromatic vinyl, or the monomer containing 1,3-butadiene or the mixture of the monomer containing 1,3-butadiene and the monomer containing aromatic vinyl may be added to a solution of the polymer block A having an active terminal. From the perspective of controlling polymerization, the polymer block A is preferably added to the solution of the monomer or the solution of the monomer mixture.

When the monomer containing 1,3-butadiene or the mixture of the monomer containing 1,3-butadiene and the monomer containing aromatic vinyl is polymerized, a polymerization temperature ranges, for example, from −80 to +150° C., preferably from 0 to 100° C., and more preferably from 20 to 90° C. As a polymerization mode, any mode such as a batch mode and a continuous mode can be adopted. Particularly, a batch mode is preferable.

When the polymer block B contains a mixture of a monomer containing 1,3-butadiene and a monomer containing aromatic vinyl, various bond modes such as a block mode, a tapered mode, and a random mode can be used as a bond mode of each of the monomers. Among these, a random mode is preferable. When the bond mode of the 1,3-butadiene and the aromatic vinyl is a random mode, the 1,3-butadiene and the aromatic vinyl are preferably supplied continuously or intermittently to a polymerization system and polymerized not to excessively increase a ratio of the aromatic vinyl with respect to total quantity of the 1,3-butadiene and the aromatic vinyl in the polymerization system.

A mass ratio of the 1,3-butadiene unit to the aromatic vinyl unit (1,3-butadiene unit/aromatic vinyl unit) of the polymer block B is preferably from 55/45 to 95/5 and more preferably from 55/45 to 90/10 from the perspective of improving reactivity between the silane coupling agent and the polymer to reduce tan δ at or near 60° C. and further reduce rolling resistance of a vulcanized product.

In addition to the 1,3-butadiene unit and the aromatic vinyl unit, the polymer block B may further contain a structural unit based on other monomers. Examples of the other monomers used to form another structural unit include a conjugated diene monomer other than isoprene such as 2,3-dimethyl-1,3-butadiene, 2-chloro-1,3-butadiene, 1,3-pentadiene, and 1,3-hexadiene; α,β-unsaturated nitrile such as acrylonitrile and methacrylonitrile; an unsaturated carboxylic acid or an acid anhydride such as an acrylic acid, a methacrylic acid, and a maleic anhydride; unsaturated carboxylic acid ester such as methylmethacrylate, ethylacrylate, and butylacrylate; non-conjugated diene such as 1,5-hexadiene, 1,6-heptadiene, 1,7-octadiene, dicyclopentadiene, and 5-ethylidene-2-norbornene; and isoprene.

A content of the structural unit based on the other monomers in the polymer block B is preferably not greater than 50 mass %, more preferably not greater than 40 mass %, and even more preferably not greater than 35 mass %, in the polymer block B.

To regulate a vinyl bond content in the 1,3-butadiene unit in the polymer block B, a polar compound is preferably added to an inert solvent at the time of polymerization. However, when the polymer block A is prepared by adding the polar compound in an amount sufficient for regulating the vinyl bond content in the 1,3-butadiene in the polymer block B, no polar compound may further be added. Specific examples of the polar compound used to regulate the vinyl bond content are the same as the polar compound used for forming the polymer block A as described above. A used amount of the polar compound may be determined according to a target vinyl bond content, and the used amount of the polar compound is preferably from 0.01 to 100 mol and more preferably from 0.1 to 30 mol, with respect to 1 mol of the polymerization initiator. When the used amount of the polar compound is in this range, it is easy to regulate the vinyl bond content in the 1,3-butadiene unit, and a defect due to deactivation of the polymerization initiator is difficult to generate.

The vinyl bond content in the 1,3-butadiene unit in the polymer block B is preferably from 10 to 90 mass %, more preferably from 20 to 80 mass %, and particularly preferably from 25 to 70 mass %.

Through steps A and B, the conjugated diene polymer chain having an active terminal and containing the polymer block A and the polymer block B can be obtained.

From the perspective of productivity, the conjugated diene polymer chain having an active terminal preferably includes the polymer block A-the polymer block B, and a terminal of the polymer block B is preferably an active terminal, but the conjugated diene polymer chain having an active terminal may include a plurality of the polymer blocks A and may include other polymer blocks. Examples of the conjugated diene polymer chain having an active terminal include a conjugated diene polymer chain including the polymer block A-the polymer block B-the polymer block A; and a conjugated diene polymer chain including a block including the polymer block A-the polymer block B-isoprene alone. When a block including isoprene alone is formed on the active terminal side of the conjugated diene polymer chain, a used amount of the isoprene is preferably from 10 to 100 mol, more preferably from 15 to 70 mol, and even more preferably from 20 to 35 mol, with respect to 1 mol of the polymerization initiator used for first polymerization reaction.

A mass ratio of the polymer block A to the polymer block B in the conjugated diene polymer chain having an active terminal (when there are a plurality of the polymer blocks A and B, total mass of the plurality of polymer blocks A, and total mass of the plurality of polymer blocks B serve as references) is preferably from 0.1/99.9 to 10/90, more preferably from 0.3/99.7 to 7/93, and even more preferably from 0.5/99.5 to 5/95 as (mass of polymer block A)/(mass of polymer block B), from the perspective of further improving the effect of the present technology.

Molecular weight distribution expressed by a ratio (Mw/Mn) of a weight average molecular weight (Mw) to a number average molecular weight (Mn) of the conjugated diene polymer chain having an active terminal is preferably from 1.0 to 3.0, more preferably from 1.0 to 2.5, and even more preferably from 1.0 to 2.2. When a value of the molecular weight distribution (Mw/Mn) of the conjugated diene polymer chain having an active terminal is in the above-described range, the specific conjugated diene rubber becomes easy to produce. Note that the Mw and the Mn are both values in terms of polystyrene measured by GPC.

A mass ratio of a total of the isoprene unit and the 1,3-butadiene unit to the aromatic vinyl unit (total of isoprene unit and 1,3-butadiene unit/aromatic vinyl unit) in the conjugated diene polymer chain having an active terminal is preferably from 50/50 to 99.995/0.005, more preferably from 55/45 to 95/5, and even more preferably from 55/45 to 90/10, from the perspective of further improving the effect of the present technology. Additionally, a vinyl bond content in the isoprene unit and the 1,3-butadiene unit in the conjugated diene polymer chain having an active terminal is the same as the vinyl bond content in the 1,3-butadiene unit in the polymer block B as described above.

Step C

Step C is a step of reacting a polyorganosiloxane represented by Formula (3) below with the active terminal of the conjugated diene polymer chain obtained at step B, and forming the polymer block C.

Formula (3)

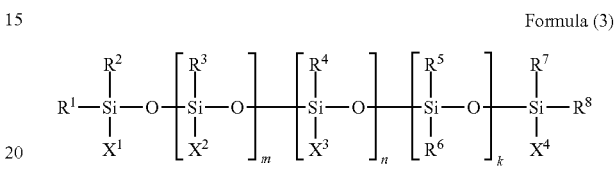

In Formula (3) above, $R^1$ to $R^8$ are each an alkyl group having from 1 to 6 carbons or an aryl group having from 6 to 12 carbons, and may be identical to or different from one another. $X^1$ and $X^4$ are each any group selected from the group consisting of an alkyl group having from 1 to 6 carbons, an aryl group having from 6 to 12 carbons, an alkoxy group having from 1 to 5 carbons, and an epoxy group-containing group having from 4 to 12 carbons, and may be identical to or different from one another. $X^2$ is an alkoxy group having from 1 to 5 carbons or an epoxy group-containing group having from 4 to 12 carbons, and when a plurality of the $X^2$ are present, the plurality of $X^2$ may be identical to or different from one another. $X^3$ is a group containing from 2 to 20 repeating alkylene glycol units, and when a plurality of the $X^3$ are present, the plurality of $X^3$ may be identical to or different from one another. m is an integer from 3 to 200, n is an integer from 0 to 200, and k is an integer from 0 to 200.

Examples of the alkyl group having from 1 to 6 carbons and represented by any of $R^1$ to $R^8$, $X^1$, and $X^4$ in the polyorganosiloxane represented by Formula (3) above include a methyl group, an ethyl group, an n-propyl group, an isopropyl group, a butyl group, a pentyl group, a hexyl group, and a cyclohexyl group. Examples of the aryl group having from 6 to 12 carbons include a phenyl group, and a methylphenyl group. Among these, a methyl group and an ethyl group are preferable from the perspective of production of the polyorganosiloxane itself.

Examples of the alkoxy group having from 1 to 5 carbons and represented by any of $X^1$, $X^2$, and $X^4$ in the polyorganosiloxane represented by Formula (3) above include a methoxy group, an ethoxy group, a propoxy group, an isopropoxy group, and a butoxy group. Particularly, a methoxy group and an ethoxy group are preferable from the perspective of reactivity with the active terminal of the conjugated diene polymer chain.

Examples of the epoxy group-containing group having from 4 to 12 carbons and represented by any of $X^1$, $X^2$, and $X^4$ in the polyorganosiloxane expressed by Formula (3) above include a group represented by Formula (4) below.

Formula (4)

In Formula (4) above, $Z^1$ is an alkylene group or an alkyl arylene group having from 1 to 10 carbons; $Z^2$ is a methylene group, a sulfur atom, or an oxygen atom; and E is an epoxy group-containing hydrocarbon group having from 2 to 10 carbons. In Formula (4) above, * represents a join position.

In the group represented by Formula (4) above, preferably, $Z^2$ is an oxygen atom; more preferably, $Z^2$ is an oxygen atom and E is a glycidyl group; and particularly preferably, $Z^1$ is an alkylene group having from 1 to 3 carbons, $Z^2$ is an oxygen atom, and E is a glycidyl group.

In the polyorganosiloxane represented by Formula (3) above, $X^1$ and $X^4$ are each preferably an epoxy group-containing group having from 4 to 12 carbons or an alkyl group having from 1 to 6 carbons among the above, and $X^2$ is preferably an epoxy group-containing group having from 4 to 12 carbons among the above. More preferably, $X^1$ and $X^4$ are each an alkyl group having from 1 to 6 carbons and $X^2$ is an epoxy group-containing group having from 4 to 12 carbons.

In the polyorganosiloxane represented by Formula (3) above, a group represented by Formula (5) below is preferable as $X^3$, that is, the group containing from 2 to 20 repeating alkylene glycol units.

*—P—(O—CH$_2$CHR)$_t$-Q   Formula (5)

In Formula (5) above, t is an integer from 2 to 20, P is an alkylene group or an alkyl arylene group having from 2 to 10 carbons, R is a hydrogen atom or a methyl group, and Q is an alkoxy group or an aryloxy group having from 1 to 10 carbons. In Formula (5) above, * indicates a join position. Among these, preferably, t is an integer from 2 to 8, P is an alkylene group having 3 carbons, R is a hydrogen atom, and Q is a methoxy group.

In the polyorganosiloxane represented by Formula (3) above, m is an integer from 3 to 200, preferably an integer from 20 to 150, and more preferably an integer from 30 to 120. Since m is an integer of 3 or greater, the specific conjugated diene rubber has high affinity with the silica, and as a result, a vulcanized product of the rubber composition for a tire according to an embodiment of the present technology has excellent wear resistance performance and wet performance. Additionally, since m is an integer of not greater than 200, production of the polyorganosiloxane itself becomes easy, and the rubber composition for a tire according to an embodiment of the present technology has low viscosity and excellent processability.

In the polyorganosiloxane represented by Formula (3) above, n is an integer from 0 to 200, preferably an integer from 0 to 150, and more preferably an integer from 0 to 120. Additionally, in the polyorganosiloxane represented by Formula (3) above, k is an integer from 0 to 200, preferably an integer from 0 to 150, and more preferably an integer from 0 to 130.

In the polyorganosiloxane represented by Formula (3) above, the total number of m, n, and k is preferably from 3 to 400, more preferably from 20 to 300, and particularly preferably from 30 to 250.

Note that it is considered that, in the polyorganosiloxane represented by Formula (3) above, when an epoxy group in the polyorganosiloxane reacts with the active terminal of the conjugated diene polymer chain, at least a portion of the epoxy group in the polyorganosiloxane ring-opens, and accordingly, a bond is formed between a carbon atom of the portion of the epoxy group ring-opened and the active terminal of the conjugated diene polymer chain. Additionally, it is considered that, when an alkoxy group in the polyorganosiloxane reacts with the active terminal of the conjugated diene polymer chain, at least a portion of the alkoxy group in the polyorganosiloxane is detached, and accordingly, a bond is formed between a silicon atom in the polyorganosiloxane to which the detached alkoxy group has been bonded and the active terminal of the conjugated diene polymer chain.

A used amount of the polyorganosiloxane (also referred to as a "modifying agent" below) is an amount causing a ratio of the total number of moles of an epoxy group and an alkoxy group in the modifying agent with respect to 1 mole of the polymerization initiator used for polymerization to preferably range from 0.1 to 1, more preferably range from 0.2 to 0.9, and even more preferably range from 0.3 to 0.8.

In the method of producing the specific conjugated diene rubber, the polymer block C is formed by modifying the conjugated diene polymer chain having an active terminal with the modifying agent described above, and additionally, the active terminal of a portion of the conjugated diene polymer chain may be deactivated without inhibiting the effect of the present technology by adding a polymerization terminator, a polymerization terminal modifying agent other than the modifying agent described above, a coupling agent, and the like to a polymerization system. In other words, the specific conjugated diene rubber may include the active terminal of a portion of the conjugated diene polymer chain deactivated by a polymerization terminator, a polymerization terminal modifying agent other than the modifying agent described above, a coupling agent, and the like without inhibiting the effect of the present technology.

Examples of the polymerization terminal modifying agent and the coupling agent used in this case include N-substituted cyclic amide such as N-methyl-2-pyrrolidone, N-vinyl-2-pyrrolidone, N-phenyl-2-pyrrolidone, and N-methyl-ε-caprolactam; N-substituted cyclic urea such as 1,3-dimethylethylene urea and 1,3-diethyl-2-imidazolidinone; N-substituted aminoketone such as 4,4'-bis(dimethylamino)benzophenone and 4,4'-bis(diethylamino)benzophenone; aromatic isocyanate such as diphenylmethane diisocyanate and 2,4-tolylene diisocyanate; N,N-di-substituted aminoalkylmethacrylamide such as N,N-dimethylaminopropylmethacrylamide; N-substituted aminoaldehyde such as 4-N, N-dimethylaminobenzaldehyde; N-substituted carbodiimide such as dicyclohexylcarbodiimide; Schiff bases such as N-ethylethylidene imine and N-methylbenzylidene imine; a pyridyl group-containing vinyl compound such as 4-vinylpyridine; tin tetrachloride; and a halogenated silicon compound such as silicon tetrachloride, hexachlorodisilane, bis(trichlorosilyl)methane, 1,2-bis(trichlorosilyl)ethane, 1,3-bis(trichlorosilyl)propane, 1,4-bis(trichlorosilyl)butane, 1,5-bis(trichlorosilyl)pentane, and 1,6-bis(trichlorosilyl)hexane. A tire obtained by using highly branched specific conjugated diene rubber obtained by using a halogenated silicon compound having not less than 5 silicon-halogen atom bonds per molecule as a coupling agent in combination with the above has excellent steering stability. A single type of the polymerization terminal modifying agent and a single type of the coupling agent may be used alone, or two or more types thereof may be used in combination.

When the modifying agent described above is reacted with the active terminal of the specific conjugated diene polymer chain, the modifying agent and the like are preferably added to a solution containing the conjugated diene polymer chain having the active terminal, and from the perspective of good controlling of reaction, the modifying agent and the like are more preferably dissolved in an inert solvent and added to a polymerization system. Solution concentration of the solution containing the conjugated diene polymer chain having the active terminal preferably ranges from 1 to 50 mass %.

Timing of adding the modifying agent and the like is not particularly limited, but the modifying agent and the like are desirably added in a state where polymerization reaction in the conjugated diene polymer chain having the active terminal has not been completed and the solution containing the conjugated diene polymer chain having the active terminal contains a monomer, more specifically, in a state where the solution containing the conjugated diene polymer chain having the active terminal contains preferably not less than 100 ppm of a monomer, and more preferably from 300 to 50000 ppm of a monomer. The modifying agent and the like are added in this manner, and accordingly, side reaction between the conjugated diene polymer chain having the active terminal and impurities in a polymerization system can be suppressed to achieve good controlling of reaction.

As conditions used in reacting the modifying agent and the like described above with the active terminal of the conjugated diene polymer chain, a temperature is, for example, from 0 to 100° C. and preferably from 30 to 90° C., and reaction time of each of the modifying agent and the like is, for example, from 1 minute to 120 minutes and preferably from 2 minutes to 60 minutes.

After the modifying agent and the like are reacted with the active terminal of the conjugated diene polymer chain, a polymerization terminator such as an alcohol such as methanol and isopropanol or water is preferably added to deactivate the active terminal unreacted.

After the active terminal of the conjugated diene polymer chain is deactivated, an anti-aging agent such as a phenol-based stabilizer, a phosphorus-based stabilizer, and a sulfur-based stabilizer, a crumbling agent, an antiscale agent, and the like are added to a polymerization solution as desired, and subsequently, a polymerization solvent is separated from the polymerization solution by direct drying, steam stripping, or the like to recover the resulting specific conjugated diene rubber. Note that before the polymerization solvent is separated from the polymerization solution, extender oil may be mixed with the polymerization solution to recover the specific conjugated diene rubber as oil-extended rubber.

Examples of the extender oil used for recovering the specific conjugated diene rubber as oil-extended rubber include paraffin-based, aromatic-based, and naphthene-based petroleum-based softeners, a vegetable-based softener, and a fatty acid. When the petroleum-based softener is used, a polycyclic aromatic content derived by the method of IP346 (inspection method of THEINSTITUTEPETROLEUM in the United Kingdom) is preferably less than 3%. When the extender oil is used, a used amount of the extender oil is, for example, from 5 to 100 parts by mass, preferably from 10 to 60 parts by mass, and more preferably from 20 to 50 parts by mass, per 100 parts by mass of the specific conjugated diene rubber.

The specific conjugated diene rubber preferably contains at least the polymer blocks A, B, and C, and preferably further includes a plurality of the conjugated diene polymer chains containing the polymer blocks A and B and joined based on the polymer block C. In this case, not less than three conjugated diene polymer chains are joined per molecule of the specific conjugated diene rubber. Herein, specific conjugated diene rubber including not less than three conjugated diene polymer chains joined per molecule is referred to as "specific conjugated diene rubber having three or more branches." A content of the specific conjugated diene rubber having three or more branches is preferably from 5 to 40 mass %, more preferably from 5 to 30 mass %, and even more preferably from 10 to 20 mass %, with respect to the specific conjugated diene rubber. When the content of the specific conjugated diene rubber having three or more branches is in the above-described range, coagulability and dryability during production of the specific conjugated diene rubber improve to further improve the rubber composition for a tire according to an embodiment of the present technology and wear resistance of a vulcanized product. Note that the content (mass %) of the specific conjugated diene rubber having three or more branches with respect to the specific conjugated diene rubber is expressed as a coupling ratio of the three or more branches of the conjugated diene polymer chain. This coupling ratio can be measured by gel permeation chromatography (in terms of polystyrene). According to a chart obtained by the gel permeation chromatography measurement, a ratio of the area of a peak portion having a peak top molecular weight 2.8 or more times a peak top molecular weight indicated by a peak of the smallest molecular weight with respect to the total elution area is defined as the coupling ratio of the three or more branches of the conjugated diene polymer chain.

An aromatic vinyl unit content in the specific conjugated diene rubber is preferably from 38 to 48 mass % and more preferably from 40 to 45 mass % from the perspective of further improving the effect of the present technology.

A vinyl bond content in the specific conjugated diene rubber is preferably from 20 to 35 mass % and more preferably from 25 to 30 mass % from the perspective of further improving the effect of the present technology. Note that the vinyl bond content refers to a proportion (mass %) of a vinyl bond in the specific conjugated diene rubber.

A weight average molecular weight (Mw) of the specific conjugated diene rubber is preferably from 400000 to 750000 and more preferably from 500000 to 700000 from the perspective of further improving the effect of the present technology. Note that the weight average molecular weight is a value in terms of polystyrene measured by gel permeation chromatography (GPC).

An average glass transition temperature of the specific conjugated diene rubber is preferably from −40 to −20° C. and more preferably from −35 to −25° C. from the perspective of further improving the effect of the present technology. Note that the average glass transition temperature is measured at a temperature elevation speed of 20° C./minute by using a differential scanning calorimeter (DSC) and calculated by a midpoint method.

Molecular weight distribution expressed by a ratio (Mw/Mn) of the weight average molecular weight (Mw) to the number average molecular weight (Mn) of the specific conjugated diene rubber is preferably from 1.1 to 3.0, more preferably from 1.2 to 2.5, and particularly preferably from 1.2 to 2.2. Note that the Mw and the Mn are both values in terms of polystyrene measured by GPC.

Mooney viscosity ($ML_{1+4}$, 100° C.) of the specific conjugated diene rubber is preferably from 20 to 100, more preferably from 30 to 90, and particularly preferably from 35 to 80. Note that when the specific conjugated diene rubber is obtained as oil-extended rubber, Mooney viscosity of the oil-extended rubber is preferably set in the above-described range.

A content of the specific conjugated diene rubber in the diene rubber (A) is not less than 10 mass %. When the content of the specific conjugated diene rubber is less than 10 mass %, processability is poor and wear resistance and wet performance of the vulcanized product are poor. From the perspective of further improving the effect of the present technology, the content of the specific conjugated diene rubber is preferably from 30 to 70 mass % and more preferably from 40 to 65 mass %.

Note that the "content of the specific conjugated diene rubber in the diene rubber (A)" refers to a content of the specific conjugated diene rubber with respect to all the diene rubber (A).

Butadiene Rubber

From the perspective of further improving wear resistance performance of a vulcanized product, the diene rubber (A) preferably contains butadiene rubber, and particularly, the diene rubber (A) more preferably contains butadiene rubber having a linearity index value of from 120 to 150.

Note that the linearity index value is solution viscosity (centipoise) of a 5 wt. % toluene solution of butadiene rubber at 30° C., and indicates a degree of entanglement of molecules in the toluene concentrated solution, and serves as a measure of a degree of branching of a polymer chain with the same molecular weight. In other words, in the case of butadiene rubber having the same Mooney viscosity, smaller toluene solution viscosity indicates a larger degree of branching, and conversely, larger toluene solution viscosity indicates a smaller degree of branching, and high linearity.

As long as the linearity index value is in the above-described range, wear resistance and processability of a vulcanized product further improve.

Examples of the butadiene rubber having the linearity index value in the above-described range include (with the linearity index value in parentheses) BR150L (120) and BR230 (120) available from Ube Industries, Ltd.; and CB24 (135) available from Lanxess.

A content of the butadiene rubber is preferably from 10 to 40%, and more preferably from 20 to 30%, with respect to the diene rubber (A) from the perspective of further improving the effect of the present technology.

Silica (B)

The silica in the rubber composition for a tire according to an embodiment of the present technology is not particularly limited as long as the silica is silica having a cetyltrimethylammonium bromide (CTAB) adsorption specific surface area from 180 to 250 m²/g, and any known silica compounded in a rubber composition for a tire in application such as a tire can be used.

Examples of the silica include wet silica, dry silica, fumed silica, and diatomaceous earth. A single type of the silica may be used alone, or two or more types thereof may be used in combination.

Note that when the CTAB adsorption specific surface area is not in the above-described range, a molecular chain of the diene rubber (A) of the present technology is difficult to constrain by a primary aggregate of silica particulate elements, and the reinforcement effect cannot be obtained sufficiently, and therefore, the effect of the present technology cannot be obtained.

Note that the CTAB adsorption specific surface area is a value measured in accordance with American Society for Testing and Materials (ASTM) D3765.

A content of the silica is not particularly limited, but from the perspective of further improving the effect of the present technology, the content of the silica is preferably from 90 to 150 parts by mass, and more preferably from 100 to 150 parts by mass, per 100 parts by mass of the diene rubber (A).

Silane Coupling Agent (C)

The rubber composition for a tire according to an embodiment of the present technology contains a silane coupling agent represented by Formula (2) below as the silane coupling agent (C).

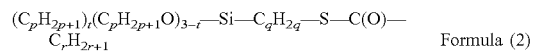

$$(C_pH_{2p+1})_t(C_pH_{2p+1}O)_{3-t}\text{—Si—}C_qH_{2q}\text{—S—C(O)—}C_rH_{2r+1} \quad \text{Formula (2)}$$

In Formula (2) above, p represents an integer from 1 to 3, and from the perspective of obtaining high affinity with silica to improve processability of the rubber composition for a tire and to improve dispersibility of silica in the rubber composition for a tire, p is preferably from 2 to 3 and more preferably 2.

In Formula (2) above, q represents an integer from 1 to 3, and from the perspective of improving processability of the rubber composition for a tire and improving dispersibility of silica in the rubber composition for a tire, q is preferably from 2 to 3 and more preferably 2.

In Formula (2) above, r represents an integer from 1 to 15, and from the perspective of protecting a mercapto group to enable kneading of the rubber composition for a tire at high temperature and to improve scorch time at the time of kneading the rubber composition for a tire, r is preferably from 5 to 10, more preferably from 6 to 9, and even more preferably 7.

In Formula (2) above, t represents an integer from 0 to 2, and from the perspective of further improving the effect of the present technology, t is preferably 0 or 1 and more preferably 0.

A content of the silane coupling agent (C) is not particularly limited, but from the perspective of further improving the effect of the present technology, the content of the silane coupling agent (C) is preferably from 4.0 to 15.0 parts by mass, more preferably from 6.0 to 13.0 parts by mass, and even more preferably from 8 to 12 parts by mass per 100 parts by mass of the silica.

Note that a single type of the silane coupling agent (C) may be used alone, or two or more types thereof may be used in combination.

The silane coupling agent described above can be produced by a known method, for example, a method described in JP 2001-505225 T. An example of a commercially available product of the silane coupling agent includes NXT silane available from Momentive Performance Materials Inc. Note that the silane coupling agent (C) can also be compounded by treating the silica (B) in advance and adding and mixing this treated silica to the diene rubber (A).

Optional Components

Aromatic Modified Terpene Resin

The rubber composition for a tire according to an embodiment of the present technology preferably contains an aromatic modified terpene resin from the perspective of improving processability and wet performance. A softening point of the aromatic modified terpene resin is not particularly limited, but is preferably from 60 to 150° C. and more preferably from 100 to 130° C. Here, the softening point is a Vicat softening point measured in accordance with Japanese Industrial Standards (JIS) K7206:1999.

A content of the aromatic modified terpene resin is not particularly limited, but is preferably from 1 to 50 parts by mass, and more preferably from 3 to 30 parts by mass, per 100 parts by mass of the diene rubber (A) from the perspective of further improving the effect of the present technology.

The aromatic modified terpene resin is obtained by polymerizing terpene and an aromatic compound other than phenol. Examples of the terpene include α-pinene, β-pinene, dipentene, and limonene. Examples of the aromatic compound include styrene, α-methylstyrene, vinyl toluene, and indene. Such an aromatic modified terpene resin has good miscibility with the diene rubber, and therefore, the aromatic modified terpene resin can particularly enhance wet performance. Note that a single type of the aromatic modified terpene resin may be used alone, or two or more types thereof may be used in combination.

Vulcanization Accelerator

The rubber composition for a tire according to an embodiment of the present technology preferably contains a vulcanization accelerator from the perspective of shortening vulcanization time and improving productivity. Any known vulcanization accelerator can be used as the vulcanization accelerator. Examples of the vulcanization accelerator include a thiuram-based vulcanization accelerator, a sulfenamide-based vulcanization accelerator, a guanidine-based vulcanization accelerator, and a thiazole-based vulcanization accelerator. Particularly, a thiuram-based vulcanization accelerator is preferable from the perspective of further improving the effect of the present technology. Note that a single type of the vulcanization accelerator may be used alone, or two or more types of thereof may be used in combination.

A content of the vulcanization accelerator is not particularly limited, but from the perspective of further improving the effect of the present technology, the content of the vulcanization accelerator is preferably from 2 to 6 parts by mass per 100 parts by mass of the diene rubber (A).

Metal Salt

The rubber composition for a tire according to an embodiment of the present technology preferably contains a metal salt from the perspective of improving processability. Particularly, the rubber composition for a tire according to an embodiment of the present technology more preferably contains at least one metal salt selected from the group consisting of a potassium salt, a sodium salt, a calcium salt, and a zinc salt.

Examples of the metal salt include a potassium salt, a sodium salt, a calcium salt, and a zinc salt of an unsaturated fatty acid such as acrylic acid, crotonic acid, isocrotonic acid, undecylenic acid, oleic acid, elaidic acid, setoleic acid, erucic acid, brassidic acid, sorbic acid, linoleic acid, linolenic acid, and arachidonic acid. Note that the metal salt is preferably a potassium salt from the perspective of further improving the effect of the present technology. Note that a single type of the metal salt may be used alone, or two or more types thereof may be used in combination.

The metal salt is incorporated in a known processing aid used in a rubber composition, and in the rubber composition according to an embodiment of the present technology, such a processing aid is preferably used from the perspective of further improving processability. A content of the processing aid is preferably from 0.1 to 5.0 parts by mass, and more preferably from 2.0 to 4.0 parts by mass, per 100 parts by mass of the diene rubber (A).

Carbon Black

In the rubber composition for a tire according to an embodiment of the present technology, carbon black may be compounded together with silica. A compounded amount of the carbon black is preferably from 1 to 20 parts by mass, and more preferably from 5 to 15 parts by mass, per 100 parts by mass of the diene rubber (A) from the perspective of further improving the effect of the present technology.

Other Components

In addition to the components described above, various additives generally used in a rubber composition for a tire such as sulfur, an anti-aging agent, a zinc oxide, stearic acid, and a softener can be compounded in the rubber composition for a tire according to an embodiment of the present technology. Note that the rubber composition for a tire can be mixed by using a known mixer, and in this case, the above-described rubber components and the silica (may optionally include carbon black) are preferably mixed with the silane coupling agent at 150 to 180° C. from the perspective of exhibiting the effect of the present technology.

Preparation of Rubber Composition for Tire

A method of producing the rubber composition for a tire according to an embodiment of the present technology is not particularly limited, and a specific example of the method of producing the rubber composition for a tire include a method including kneading the above-described respective components by using a known method and a known device (for example, a Banbury mixer, a kneader, and a roller). When the rubber composition for a tire according to an embodiment of the present technology contains sulfur or a vulcanization accelerator, the components other than the sulfur and the vulcanization accelerator are preferably mixed first at a high temperature (preferably from 100 to 155° C.) and cooled before the sulfur or the vulcanization accelerator is mixed.

Additionally, the rubber composition for a tire according to an embodiment of the present technology can be vulcanized or crosslinked under known vulcanizing or crosslinking conditions.

Pneumatic Tire

A pneumatic tire according to an embodiment of the present technology is a pneumatic tire produced by using the above-described rubber composition for a tire according to an embodiment of the present technology. Particularly, the pneumatic tire according to an embodiment of the present technology is preferably a pneumatic tire including the rubber composition for a tire according to an embodiment of the present technology disposed in a tire tread.

FIG. 1 is a partial cross-sectional schematic view of a tire representing an example of a pneumatic tire according to an embodiment of the present technology, but the present technology is not limited to the embodiment illustrated in FIG. 1.

FIG. 1 illustrates a bead portion 1, a sidewall portion 2, and a tire tread portion 3.

Additionally, a carcass layer 4 in which a fiber cord is embedded is mounted between a left-right pair of the bead portions 1, and an end portion of the carcass layer 4 is folded back from a tire inner side to a tire outer side to be turned up around a bead core 5 and a bead filler 6.

Additionally, in the tire tread portion 3, a belt layer 7 is disposed along all the circumference of the tire on an outer side of the carcass layer 4.

Additionally, in each of the bead portions 1, a rim cushion 8 is disposed in a portion being in contact with a rim.

Note that the tire tread portion 3 is formed of the above-described composition according to an embodiment of the present technology.

The pneumatic tire according to an embodiment of the present technology can be produced, for example, in accordance with a known method. Additionally, in addition to ordinary air or air having an oxygen partial pressure adjusted, an inert gas such as nitrogen, argon, and helium can be used as a gas filling the tire.

EXAMPLES

The present technology will be described in further detail below by way of examples. However, the present technology is not limited to these examples. Production of Specific Conjugated Diene Rubber Into a nitrogen-purged 100 mL ampoule bottle, cyclohexane (35 g) and tetramethylethylenediamine (1.4 mmol)

were added, and further, n-butyllithium (4.3 mmol) was added. Then, isoprene (21.6 g) and styrene (3.1 g) were slowly added, and were reacted for 120 minutes in the ampoule bottle at 50° C. to obtain a polymer block A having an active terminal. A weight average molecular weight, molecular weight distribution, an aromatic vinyl unit content, an isoprene unit content, and a 1,4-bond content were measured for this polymer block A. Measurement results thereof are shown in Table 1.

Next, into an autoclave equipped with an agitator, cyclohexane (4000 g), 1,3-butadiene (474.0 g), and styrene (126.0 g) were loaded in a nitrogen atmosphere, and then a total amount of the polymer block A having an active terminal obtained above was added to initiate polymerization at 50° C. A polymer conversion ratio was confirmed to be in the range from 95% to 100%, and then, a polyorganosiloxane A represented by Formula (6) below was added in a state of a 20 mass % xylene solution to result in an epoxy group content of 1.42 mmol (equivalent to the number of moles 0.33 times the number of moles of n-butyllithium used), and was reacted for 30 minutes. Subsequently, methanol in an amount equivalent to the number of moles twice the number of moles of n-butyllithium used was added as a polymerization terminator, and a solution containing specific conjugated diene rubber was obtained. To this solution, a small amount of an anti-aging agent (IRGANOX 1520, available from BASF) and, as extender oil, 25 parts by mass of Fukko Luella Ceramic 30 (available from Nippon Oil Corporation) per 100 parts by mass of the specific conjugated diene rubber were added, and then, solid rubber was recovered by a steam stripping process. The obtained solid rubber was dehydrated by rollers and dried in a dryer to obtain solid specific conjugated diene rubber. Further, 25 parts by mass of extender oil was added per 100 parts by mass of the obtained specific conjugated diene rubber to obtain specific conjugated diene rubber (oil-extended product).

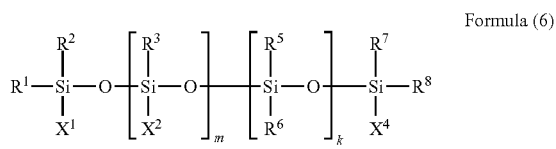

Formula (6)

In Formula (6) above, m is 80, and k is 120. Each of $X^1$, $X^4$, $R^1$ to $R^3$, and $R^5$ to $R^8$ is a methyl group. In Formula (6) above, $X^2$ is a group represented by Formula (7) below (where * indicates a join position).

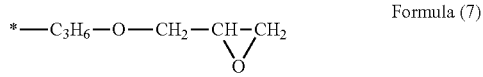

Formula (7)

Production of Comparative Conjugated Diene Rubber

Into a nitrogen-purged 100 ml ampoule bottle, 28 g of cyclohexane and 8.6 mmol of tetramethylethylenediamine were added, and further, 6.1 mmol of n-butyllithium was added. Then, 8.0 g of isoprene was slowly added, and was reacted for 120 minutes in the ampoule bottle at 60° C. to obtain an isoprene block (referred to as an initiator 1). A weight average molecular weight, molecular weight distribution, and an isoprene unit content were measured for this initiator 1. Measurement results are shown in Table 1.

Next, into an autoclave equipped with an agitator, 4000 g of cyclohexane, 357.7 g of 1,3-butadiene, and 132.3 g of styrene were loaded in a nitrogen atmosphere, and then a total amount of the initiator 1 was added to initiate polymerization at 40° C. Ten minutes after the polymerization was initiated, 195.3 g of 1,3-butadiene and 14.7 g of styrene were continuously added for 60 minutes. A maximum temperature during the polymerization reaction was 60° C. After the continuous addition ended, the polymerization reaction was further continued for 20 minutes. A polymer conversion rate was confirmed to be in the range from 95% to 100%, and then, 0.08 mmol of 1,6-bis(trichlorosilyl)hexane was added in a state of a cyclohexane solution having 20 mass % concentration, and was reacted for 10 minutes. Further, 0.027 mmol of the polyorganosiloxane A represented by Formula (6) above was added in a state of a xylene solution having 20 mass % concentration, and was reacted for 30 minutes. Subsequently, methanol in an amount equivalent to the number of moles twice the number of moles of n-butyllithium used was added as a polymerization terminator, and a solution containing comparative conjugated diene rubber was obtained. Then, a solvent in the obtained solution was removed by steam stripping and vacuum dried at 60° C. for 24 hours to obtain solid comparative conjugated diene rubber. Further, 25 parts by mass of extender oil per 100 parts by mass of the obtained comparative conjugated diene rubber was added to obtain comparative conjugated diene rubber (oil-extended product).

Note that a weight average molecular weight, molecular weight distribution, a coupling ratio of three or more branches, an aromatic vinyl unit content, a vinyl bond content, and Mooney viscosity were measured for the obtained specific conjugated diene rubber and the obtained comparative conjugated diene rubber. Measurement results are shown in Table 2. Measurement methods are as follows.

Weight Average Molecular Weight, Molecular Weight Distribution, and Coupling Ratio of Three or More Branches The weight average molecular weight, the molecular weight distribution, and the coupling ratio of three or more branches (proportion (mass %) of the "specific (or comparative) conjugated diene rubber having three or more branches" with respect to the specific conjugated diene rubber or the comparative conjugated diene rubber) were determined according to a chart obtained by gel permeation chromatography and based on a molecular weight in terms of polystyrene. Note that specific gel permeation chromatography measurement conditions are as follows.

Measurement instrument: HLC-8020 (available from Tosoh Corp.)
Column: GMH-HR-H (available from Tosoh Corp.), two columns connected in serial
Detector: Differential refractometer RI-8020 (available from Tosoh Corp.)
Eluent: Tetrahydrofuran
Column temperature: 40° C.

Here, the coupling ratio of three or more branches is a ratio (s2/s1) of the area (s2) of a peak portion having a peak top molecular weight 2.8 or more times a peak top molecular weight indicated by a peak of the smallest molecular weight with respect to the total elution area (s1).

Aromatic Vinyl Unit Content and Vinyl Bond Content

The aromatic vinyl unit content and the vinyl bond content were measured by $^1$H-NMR.

Mooney Viscosity

Mooney viscosity ($ML_{1+4}$, 100° C.) was measured in accordance with Japanese Industrial Standards (JIS) K6300-1:2013.

TABLE 1

|  | Polymer block A | Initiator 1 |
|---|---|---|
| Formula weight (as weight average molecular weight) | 8700 | 2200 |
| Molecular weight distribution (MW/Mn) | 1.10 | 1.08 |
| Content of structural unit based on monomer and containing aromatic vinyl (mass %) | 12.6 | |
| Content of structural unit based on monomer and containing isoprene (mass %) | 87.4 | 100 |
| 1,4-bond content (mass %) | 58.0 | |

TABLE 2

|  | Specific conjugated diene rubber | Comparative conjugated diene rubber |
|---|---|---|
| Weight average molecular weight | 640000 | 435000 |
| Molecular weight distribution (MW/Mn) | 1.65 | 1.46 |
| Coupling ratio of three or more branches of conjugated diene polymer chain (mass %) | 12.5 | 25.0 |
| Content of structural unit based on monomer and containing aromatic vinyl (mass %) | 42.6 | 21.0 |
| Vinyl bond content (mass %) | 29.5 | 63.3 |
| Mooney viscosity ($ML_{1+4}$, 100° C.) | 58 | 58.0 |

Preparation of Rubber Composition for Tire

Components shown in Table 3 below were compounded in proportions (parts by mass) shown in Table 3 below.

Specifically, first, the components shown in Table 3 except for sulfur and a vulcanization accelerator were mixed for 5 minutes at temperature raised at or near 150° C., and then were discharged and cooled to room temperature to obtain a master batch. Further, the sulfur and the vulcanization accelerator were mixed into the obtained master batch by using the above-described Banbury mixer to obtain a rubber composition for a tire.

Note that in Table 3, as for amounts of styrene-butadiene rubber, specific conjugated diene rubber, and comparative conjugated diene rubber, an upper value is an amount of rubber (oil-extended product) (unit: parts by mass), and a lower value is a net amount of rubber (unit: parts by mass).

Evaluation

The following evaluation was performed by using the rubber compositions for a tire obtained as test samples.

Processability

Mooney viscosity ($ML_{1+4}$) at 100° C. was measured according to a method of Japanese Industrial Standards (JIS) 6300-1:2013. Results are shown in Table 3 (in a "Processability" column of Table 3). The results were expressed by an index value obtained by dividing a measurement value of a standard example by a measurement value of each of the test samples to be multiplied by 100. A larger index value indicates better processability.

Wet Performance

The test samples (unvulcanized) were each press-vulcanized for 20 minutes at 160° C. in a mold (15 cm×15 cm×0.2 cm) to manufacture a vulcanized rubber sheet, and a sheet test piece was obtained.

A value of tan δ (0° C.) was measured for the manufactured sheet test piece in accordance with Japanese Industrial Standards (JIS) K6394:2007 by using a viscoelasticity spectrometer (available from Toyo Seiki Seisaku-sho, Ltd.) under conditions of an elongation deformation strain of 10%±2%, a vibration frequency of 20 Hz, and a temperature of 0° C.

Results are shown in Table 3 (in a "Wet performance" column of Table 3). The results are expressed by an index value with a measurement value of tan δ (0° C.) of a standard example being set to 100. A larger index value indicates a larger tan δ (0° C.) value, and better wet performance as a tire.

Note that wet performance is better when friction force in a wet environment is higher. Friction in a wet environment largely depends on a hysteresis loss (hysteresis term) due to deformation caused when a tire tread deforms in accordance with a fine ridge/groove on a road surface. An average frequency of the deformation is considered to be approximately from $10^3$ to $10^6$ Hz. As calculated by a WLF equation, an increase in tan δ of a vulcanized product measured at 20 Hz and 0° C. leads to performance improvement, and therefore, the evaluation was performed as described above.

Wear Resistance Performance

A wear resistance test was performed for the above-described sheet test piece by using a Lambourn abrasion test machine (available from Iwamoto Seisakusho Co. Ltd.) in accordance with Japanese Industrial Standards (JIS) K6264-2:2005 under conditions of applied force of 4.0 kg/cm$^3$ (=39 N), a slip rate of 30%, wear resistance test time of 4 minutes, and test temperature of room temperature, and wear mass was measured.

Results are shown in Table 3 (in a "Wear resistance performance" column of Table 3). The results are expressed by an index value obtained by dividing a measurement value of a standard example by a measurement value of the sheet test piece to be multiplied by 100. A larger index value indicates better wear resistance performance.

TABLE 3

|  | Standard Example | Comparative Example | | | | | | | | |
|---|---|---|---|---|---|---|---|---|---|---|
|  |  | 1 | 2 | 3 | 4 | 5 | 6 | 7 | 8 | 9 |
| (part 1) | | | | | | | | | | |
| Styrene-butadiene rubber | 103.13 | 103.13 | 103.13 | 103.13 | 103.13 | 61.88 | 61.88 | 61.88 | 61.88 | 61.88 |
|  | (75) | (75) | (75) | (75) | (75) | (45) | (45) | (45) | (45) | (45) |
| Comparative conjugated diene rubber |  |  |  |  |  | 37.5 | 37.5 |  |  |  |
|  |  |  |  |  |  | (30) | (30) |  |  |  |
| Specific conjugated diene rubber |  |  |  |  |  |  |  | 37.5 | 37.5 | 37.5 |
|  |  |  |  |  |  |  |  | (30) | (30) | (30) |

TABLE 3-continued

| | Standard Example | Comparative Example 1 | 2 | 3 | 4 | 5 | 6 | 7 | 8 | 9 |
|---|---|---|---|---|---|---|---|---|---|---|
| Butadiene rubber 1 | 25 | 25 | 25 | 25 | 25 | 25 | 25 | 25 | 25 | 25 |
| Butadiene rubber 2 | | | | | | | | | | |
| Carbon black | 5 | 5 | 5 | 5 | 5 | 5 | 5 | 5 | 5 | 5 |
| Silica 1 | 100 | 100 | 100 | | | | | 100 | | |
| Silica 2 | | | | 100 | 100 | 100 | 100 | | 100 | 100 |
| Zinc oxide | 3 | 3 | 3 | 3 | 3 | 3 | 3 | 3 | 3 | 3 |
| Stearic acid | 1 | 1 | 1 | 1 | 1 | 1 | 1 | 1 | 1 | 1 |
| Comparative silane coupling agent 1 | 8 | | | 8 | | | | 8 | 8 | |
| Comparative silane coupling agent 2 | | 8 | | | | 8 | | | | 8 |
| Silane coupling agent | | | 8 | | 8 | | 8 | | | |
| Metal salt | | | | | | | | | | |
| Aromatic modified terpene resin | | | | | | | | | | |
| Aroma oil | 20 | 20 | 20 | 20 | 20 | 23.75 | 23.75 | 23.75 | 23.75 | 23.75 |
| Sulfur | 2 | 2 | 2 | 2 | 2 | 2 | 2 | 2 | 2 | 2 |
| Vulcanization accelerator 1 | 2 | 2 | 2 | 2 | 2 | 2 | 2 | 2 | 2 | 2 |
| Vulcanization accelerator 2 | | | | | | | | | | |
| Vulcanization accelerator 3 | 1.5 | 1.5 | 1.5 | 1.5 | 1.5 | 1.5 | 1.5 | 1.5 | 1.5 | 1.5 |
| Processability | 100 | 92 | 105 | 88 | 103 | 96 | 98 | 102 | 92 | 99 |
| Wear resistance performance | 100 | 95 | 98 | 90 | 98 | 98 | 99 | 95 | 101 | 100 |
| Wet performance (part 2) | 100 | 98 | 98 | 105 | 99 | 101 | 101 | 100 | 105 | 102 |
| Styrene-butadiene rubber | 103.13 (75) | 61.88 (45) | 61.88 (45) | 61.88 (45) | 61.88 (45) | 61.88 (45) | 61.88 (45) | 61.88 (45) | 95.57 (70) | 61.88 (45) |
| Comparative conjugated diene rubber | | | | | | | | | | |
| Specific conjugated diene rubber | | 37.5 (30) | 37.5 (30) | 37.5 (30) | 37.5 (30) | 37.5 (30) | 37.5 (30) | 37.5 (30) | 37.5 (30) | 37.5 (30) |
| Butadiene rubber 1 | 25 | 25 | 25 | 25 | | | | | | 25 |
| Butadiene rubber 2 | | | | | 25 | 25 | 25 | 25 | | |
| Carbon black | 5 | 5 | 5 | 5 | 5 | 5 | 5 | 5 | 5 | 5 |
| Silica 1 | 100 | | | | | | | | | |
| Silica 2 | | 100 | 100 | 150 | 100 | 100 | 100 | 100 | 100 | 80 |
| Zinc oxide | 3 | 3 | 3 | 3 | 3 | 3 | 3 | 3 | 3 | 3 |
| Stearic acid | 1 | 1 | 1 | 1 | 1 | 1 | 1 | 1 | 1 | 1 |
| Comparative silane coupling agent 1 | 8 | | | | | | | | | |
| Comparative silane coupling agent 2 | | | | | | | | | | |
| Silane coupling agent | | 8 | 10 | 12 | 8 | 8 | 8 | 8 | 8 | 8 |
| Metal salt | | | | | | 4 | | | | |
| Aromatic modified terpene resin | | | | | | | 4 | | | |
| Aroma oil | 20 | 23.75 | 23.75 | 23.75 | 23.75 | 23.75 | 23.75 | 23.75 | 23.75 | 23.75 |
| Sulfur | 2 | 2 | 2 | 2 | 2 | 2 | 2 | 2 | 2 | 2 |
| Vulcanization accelerator 1 | 2 | 2 | 2 | 2 | 2 | 2 | 2 | 2 | 2 | 2 |
| Vulcanization accelerator 2 | | | | | | | | 0.5 | | |
| Vulcanization accelerator 3 | 1.5 | 1.5 | 1.5 | 1.5 | 1.5 | 1.5 | 1.5 | 1.5 | 1.5 | 1.5 |

TABLE 3-continued

| | Standard Example | Comparative Example | | | | | | | | |
|---|---|---|---|---|---|---|---|---|---|---|
| | | 1 | 2 | 3 | 4 | 5 | 6 | 7 | 8 | 9 |
| Processability | 100 | 103 | 106 | 101 | 103 | 108 | 105 | 103 | 102 | 108 |
| Wear resistance performance | 100 | 103 | 104 | 102 | 105 | 104 | 102 | 105 | 101 | 101 |
| Wet performance | 100 | 105 | 105 | 110 | 105 | 106 | 108 | 105 | 107 | 101 |

Details of the respective components listed in Table 3 are as follows.

Styrene-butadiene rubber: Tufdene E581 (available from Asahi Kasei Corporation; vinyl bond content: 43 mass %; content of structural unit based on monomer and containing aromatic vinyl: 37 mass %; content of structural unit based on monomer and containing isoprene: 0 mass %; Mooney viscosity: contains 69; 37.5 parts by mass of extender oil per 100 parts by mass of rubber; corresponds to the diene rubber (A))

Comparative conjugated diene rubber: Comparative conjugated diene rubber produced as described above (contains 25 parts by mass of extender oil per 100 parts by mass of rubber; Tg: −33° C.; corresponds to the diene rubber (A))

Specific conjugated diene rubber: Specific conjugated diene rubber produced as described above (contains 25 parts by mass of extender oil per 100 parts by mass of rubber; Tg: −30° C.; corresponds to the specific conjugated diene rubber)

Butadiene rubber 1: NIPOL BR 1220 (available from ZEON CORPORATION; Tg: −105° C.; linearity index value: 50; corresponds to the diene rubber (A))

Butadiene rubber 2: CB24 (available from Lanxess; butadiene rubber synthesized in the presence of a neodymium catalyst; linearity index value: 135; corresponds to the diene rubber (A))

Carbon black: Show Black N339 (available from Cabot Japan K.K.)

Silica 1: Zeosil 1165MP (available from Rhodia; CTAB specific surface area: 159 m²/g)

Silica 2: Premium 200MP (available from Rhodia; CTAB specific surface area: 200 m²/g)

Comparative silane coupling agent 1: Si69 (available from Evonik Degussa Corporation; bis(triethoxysilylpropyl)tetrasulfide)

Comparative silane coupling agent 2: Si363 (available from Evonik Degussa Corporation; represented by Formula (8) below)

Silane coupling agent: NXT silane (available from Momentive Performance Materials Inc.; represented by Formula (9) below)

Aromatic modified terpene resin: YS RESIN TO-125 (available from Yasuhara Chemical Co., Ltd.; softening point 125±5° C.)

Metal salt: HT207 (available from Schill+Seilacher GmbH; processing aid containing a mixture of a fatty acid potassium salt and fatty acid ester)

Zinc oxide: Zinc Oxide III (available from Seido Chemical Industry Co., Ltd.)

Stearic acid: Beads stearic acid (available from NOF Corporation)

Aroma oil: Extract No. 4S (available from Showa Shell Sekiyu K.K.)

Sulfur: Golden Flower oil treated sulfur powder (sulfur content: 95.24 mass %; available from Tsurumi Chemical Industry Co., Ltd.)

Vulcanization accelerator 1: Soxinol D-G (available from Sumitomo Chemical Co., Ltd.; 1,3-diphenylguanidine)

Vulcanization accelerator 2: NOCCELER CZ-G (available from Ouchi Shinko Chemical Industrial Co., Ltd.; N-cyclohexyl-2-benzothiazolylsulfenamide)

Vulcanization accelerator 3: NOCCELER TOT-N (available from Ouchi Shinko Chemical Industrial Co., Ltd.; tetrakis(2-ethylhexyl)thiuram disulfide; corresponding to the thiuram-based vulcanization accelerator)

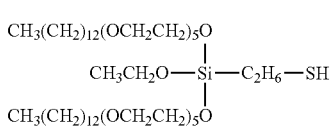

Formula (8)

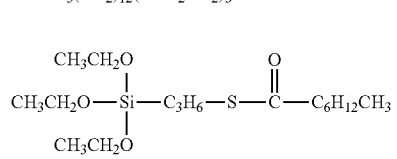

Formula (9)

As seen from the results shown in Table 1, each of the rubber compositions for a tire of Examples 1 to 9 containing the diene rubber (A) containing a predetermined amount of the specific conjugated diene rubber having a predetermined primary structure, the silica (B) having a predetermined CTAB adsorption specific surface area, and the silane coupling agent (C) having a predetermined primary structure is a rubber composition for a tire having excellent processability and capable of manufacturing a pneumatic tire having excellent wear resistance performance and wet performance.

As seen from comparison of Example 1 and Example 9, the rubber composition for a tire of Example 1 having the content of the silica (B) with respect to the diene rubber (A) in a predetermined range is a rubber composition for a tire capable of manufacturing a pneumatic tire having more excellent wear resistance performance and more excellent wet performance.

As seen from comparison of Example 1 and Example 8, the rubber composition for a tire of Example 1 containing the diene rubber (A) containing the butadiene rubber is a rubber composition for a tire having more excellent processability and capable of manufacturing a pneumatic tire having more excellent wear resistance performance.

As seen from comparison of Example 1 and Example 4, the rubber composition for a tire of Example 4 having the linearity index value of the butadiene rubber in the diene rubber (A) in a predetermined range is a rubber composition for a tire capable of manufacturing a tire having more excellent wear resistance performance.

As seen from comparison of Example 1 and Example 6, the rubber composition for a tire of Example 6 containing a predetermined amount of a predetermined aromatic modified terpene resin with respect to the diene rubber (A) is a rubber composition for a tire having more excellent processability and capable of manufacturing a pneumatic tire having more excellent wet performance.

As seen from comparison of Example 1 and Example 5, the rubber composition for a tire of Example 5 containing a predetermined metal salt is a rubber composition for a tire having more excellent processability and capable of manufacturing a pneumatic tire having more excellent wear resistance performance and more excellent wet performance.

The invention claimed is:

1. A rubber composition for a tire comprising diene rubber, silica, and a silane coupling agent, wherein
the diene rubber comprises not less than 10 mass % of a specific conjugated diene rubber represented by Formula (1), and comprising a polymer block A comprising a structural unit based on a monomer and comprising isoprene and a structural unit based on a monomer and comprising aromatic vinyl, a polymer block B comprising a structural unit based on a monomer and comprising 1,3-butadiene, and a polymer block C comprising a polyorganosiloxane;
the diene rubber comprises butadiene rubber having a linearity index value from 120 to 150;
a mass ratio of the structural unit based on a monomer and comprising isoprene to the structural unit based on a monomer and comprising aromatic vinyl, the structural unit based on a monomer and comprising isoprene/the structural unit based on a monomer and comprising aromatic vinyl, in the polymer block A is from 80/20 to 95/5, and a formula weight of the polymer block A is from 500 to 15,000;
a CTAB adsorption specific surface area of the silica is from 180 to 250 m²/g;
the silane coupling agent is a silane coupling agent represented by Formula (2);
the polyorganosiloxane is a polyorganosiloxane represented by Formula (3); and
a vinyl bond content in the specific conjugated diene rubber is from 20 to 35 mass %:

A-B-C      Formula (1)

where A represents the polymer block A, B represents the polymer block B, and C represents the polymer block C;

$(C_pH_{2p+1})_t(C_pH_{2p+1}O)_{3-t}$—Si—$C_qH_{2q}$—S—C(O)—$C_rH_{2r+1}$      Formula (2)

where p represents an integer from 1 to 3, q represents an integer from 1 to 3, r represents an integer from 1 to 15, and t represents an integer from 0 to 2; and

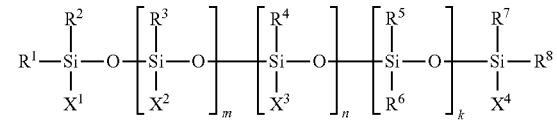

Formula (3)

where $R^1$ to $R^8$ are each an alkyl group having from 1 to 6 carbons or an aryl group having from 6 to 12 carbons, and are optionally identical to or different from one another; $X^1$ and $X^4$ are each any group selected from the group consisting of an alkyl group having from 1 to 6 carbons, an aryl group having from 6 to 12 carbons, an alkoxy group having from 1 to 5 carbons, and an epoxy group-containing group having from 4 to 12 carbons, and are optionally identical to or different from one another; $X^2$ is an alkoxy group having from 1 to 5 carbons or an epoxy group-containing group having from 4 to 12 carbons, and when a plurality of the $X^2$ are present, the plurality of $X^2$ are optionally identical to or different from one another; $X^3$ is a group containing from 2 to 20 repeating alkylene glycol units, and when a plurality of the $X^3$ are present, the plurality of $X^3$ are optionally identical to or different from one another; and m is an integer from 3 to 200, n is an integer from 0 to 200, and k is an integer from 0 to 200.

2. The rubber composition for a tire according to claim 1, wherein a weight average molecular weight of the specific conjugated diene rubber is from 400,000 to 750,000 and an average glass transition temperature of the specific conjugated diene rubber is from −40 to −20° C.

3. The rubber composition for a tire according to claim 2, wherein a content of the silica is from 90 to 150 parts by mass per 100 parts by mass of the diene rubber.

4. The rubber composition for a tire according to claim 2, further comprising a thiuram-based vulcanization accelerator.

5. The rubber composition for a tire according to claim 1, wherein a content of the silica is from 90 to 150 parts by mass per 100 parts by mass of the diene rubber.

6. The rubber composition for a tire according to claim 5, further comprising a thiuram-based vulcanization accelerator.

7. The rubber composition for a tire according to claim 1, further comprising an aromatic modified terpene resin having a softening point of from 100 to 150° C., wherein
a content of the aromatic modified terpene resin is from 1 to 50 parts by mass per 100 parts by mass of the diene rubber.

8. The rubber composition for a tire according to claim 7, further comprising a thiuram-based vulcanization accelerator.

9. The rubber composition for a tire according to claim 1, further comprising a thiuram-based vulcanization accelerator.

10. The rubber composition for a tire according to claim 1, further comprising at least one metal salt selected from the group consisting of a potassium salt, a sodium salt, a calcium salt, and a zinc salt.

11. A pneumatic tire using the rubber composition for a tire according to claim 1 in a tire tread.

* * * * *